(12) United States Patent
Zack et al.

(10) Patent No.: US 7,564,873 B1
(45) Date of Patent: Jul. 21, 2009

(54) METHOD AND APPARATUS FOR PROVIDING IN-BAND MESSAGING WITHIN A VIDEO ON DEMAND ENVIRONMENT

(75) Inventors: Steven Jeffrey Zack, Burlington, NJ (US); Christopher W. B. Goode, Menlo Park, CA (US); Yong Ho Son, Palo Alto, CA (US); Andrew G. Fletcher, Merchantville, NJ (US); Kevin J. Borusiewicz, Yardley, PA (US)

(73) Assignee: Cox Communications, Inc., Atlanta, GA (US)

( * ) Notice: Subject to any disclaimer, the term of this patent is extended or adjusted under 35 U.S.C. 154(b) by 562 days.

(21) Appl. No.: 09/458,322

(22) Filed: Dec. 10, 1999

(51) Int. Cl.
*H04N 7/025* (2006.01)
*H04N 5/445* (2006.01)
*H04J 3/02* (2006.01)
*H04H 20/28* (2008.01)

(52) U.S. Cl. .............. 370/486; 370/537; 370/487; 725/32; 725/48; 725/54; 725/59; 725/95; 725/118; 725/148

(58) Field of Classification Search ............ 725/48, 725/54, 94, 95, 98, 116, 118, 146–148, 64–67; 709/217, 219; 370/533–537
See application file for complete search history.

(56) References Cited

U.S. PATENT DOCUMENTS

| | | | | |
|---|---|---|---|---|
| 4,605,961 A | * | 8/1986 | Frederiksen | 380/215 |
| 5,506,844 A | * | 4/1996 | Rao | 370/84 |
| 5,521,927 A | * | 5/1996 | Kim et al. | 370/474 |
| 5,537,409 A | * | 7/1996 | Moriyama et al. | 370/471 |
| 5,557,320 A | * | 9/1996 | Krebs | 725/114 |
| 5,579,527 A | | 11/1996 | Chin et al. | 395/800 |
| 5,583,562 A | * | 12/1996 | Birch et al. | 348/12 |
| 5,619,337 A | * | 4/1997 | Naimpally | 386/83 |
| 5,650,825 A | * | 7/1997 | Naimpally et al. | 348/465 |
| 5,682,195 A | * | 10/1997 | Hendricks et al. | 348/6 |
| 5,726,989 A | * | 3/1998 | Dokic | 370/509 |
| 5,757,416 A | * | 5/1998 | Birch et al. | 725/144 |
| 5,784,277 A | * | 7/1998 | Meyer | 700/94 |
| 5,805,804 A | * | 9/1998 | Laursen et al. | 709/223 |
| 5,818,438 A | * | 10/1998 | Howe et al. | 345/327 |
| 5,850,218 A | * | 12/1998 | LaJoie et al. | 345/327 |
| 5,917,830 A | * | 6/1999 | Chen et al. | 370/487 |
| 5,920,700 A | * | 7/1999 | Gordon et al. | 709/226 |
| 5,940,738 A | * | 8/1999 | Rao | 725/103 |
| 5,966,120 A | * | 10/1999 | Arazi et al. | 345/724 |
| 5,987,518 A | * | 11/1999 | Gotwald | 709/230 |
| 6,018,764 A | * | 1/2000 | Field et al. | 709/217 |
| 6,029,045 A | * | 2/2000 | Picco et al. | 725/34 |
| 6,035,304 A | * | 3/2000 | Machida | 707/104 |
| 6,044,396 A | * | 3/2000 | Adams | 709/217 |
| 6,064,796 A | * | 5/2000 | Nakamura et al. | 386/131 |
| 6,078,958 A | * | 6/2000 | Echeita et al. | 709/226 |
| 6,108,695 A | | 8/2000 | Chawla | 709/217 |

(Continued)

FOREIGN PATENT DOCUMENTS

EP          1414246 A2 *    4/2004

*Primary Examiner*—Son P Huynh
(74) *Attorney, Agent, or Firm*—Merchant & Gould (57) ABSTRACT

A method and apparatus for providing in-band messaging through a video switch or other functional element forming a multiplexed content stream prior to transport processing and/or transmission of the multiplexed content stream via an in-band communications channel.

13 Claims, 4 Drawing Sheets

U.S. PATENT DOCUMENTS

| | | | |
|---|---|---|---|
| 6,115,740 A | 9/2000 | Mizutani | 709/217 |
| 6,118,820 A * | 9/2000 | Reitmeier et al. | 375/240.16 |
| 6,154,772 A * | 11/2000 | Dunn et al. | 709/217 |
| 6,181,711 B1 * | 1/2001 | Zhang et al. | 370/468 |
| 6,185,635 B1 * | 2/2001 | O'Loughlin et al. | 710/31 |
| 6,208,804 B1 * | 3/2001 | Ottesen et al. | 386/125 |
| 6,229,788 B1 * | 5/2001 | Graves et al. | 370/230 |
| 6,240,103 B1 * | 5/2001 | Schoenblum et al. | 370/468 |
| 6,240,553 B1 * | 5/2001 | Son et al. | 725/95 |
| 6,243,761 B1 * | 6/2001 | Mogul et al. | 709/246 |
| 6,356,369 B1 * | 3/2002 | Farhan | 398/72 |
| 6,378,130 B1 * | 4/2002 | Adams | 725/92 |
| 6,404,776 B1 * | 6/2002 | Voois et al. | 370/468 |
| 6,446,192 B1 * | 9/2002 | Narasimhan et al. | 712/29 |
| 6,459,427 B1 * | 10/2002 | Mao et al. | 345/327 |
| 6,483,846 B1 * | 11/2002 | Huang et al. | 370/445 |
| 6,510,555 B1 * | 1/2003 | Tsurumoto | 725/92 |
| 6,516,002 B1 * | 2/2003 | Huang et al. | 370/468 |
| 6,584,125 B1 * | 6/2003 | Katto | 370/537 |
| 6,594,271 B1 * | 7/2003 | Wu et al. | 370/412 |
| 6,782,553 B1 * | 8/2004 | Ogawa et al. | 725/146 |
| 6,820,277 B1 * | 11/2004 | Eldering et al. | 725/35 |
| 6,886,178 B1 * | 4/2005 | Mao et al. | 725/52 |
| 2001/0028784 A1 * | 10/2001 | Takasu et al. | 386/52 |

* cited by examiner

METHOD AND APPARATUS FOR PROVIDING IN-BAND MESSAGING WITHIN A VIDEO ON DEMAND ENVIRONMENT

BACKGROUND OF THE INVENTION

1. Field of the Invention

The present invention relates to an information distribution system such as a video-on-demand (VOD) system. More particularly, the present invention relates to a method and apparatus providing in-band messaging to functional elements and/or subscribers within an information distribution system.

2. Description of the Background Art

VOD systems providing content encoded according to the various Moving Pictures Experts Group (MPEG) standards are known. For example, a first standard known as MPEG-1 refers to ISO/IEC standards 11172, which is incorporated herein by reference in its entirety. A second standard known as MPEG-2 refers to ISO/IEC standards 13818, which is incorporated herein by reference in its entirety. Additionally, a compressed digital video system is described in the Advanced Television Systems Committee (ATSC) digital television standard document A/53, incorporated herein by reference.

Video on demand systems typically utilize relatively high speed communications channels (also known as "in-band" channels) to provide video content and other bandwidth-intensive information to subscribers or users within the system. Additionally, communications between various functional elements within the system and/or between the system and subscribers may be accomplished via relatively low bandwidth communications channels. These relatively low speed channels (also known as "out-of-band" channels) provide an effective means of routing command messages, control messages and other non-content data within the system. An exemplary out-of-band (OOB) communications channel comprises a non-Gigabit Ethernet network, while an exemplary in-band (IB) channel comprises a high speed data channel such as a satellite link, ASTC cable or terrestrial broadcast link and the like.

Unfortunately, it may be expensive or difficult to route appropriate out-of-band communication channel links to all of the portions of an interactive information distribution system utilizing such links. For example, a functional element serving to perform transport or transmission processing of information at a physically remote site such as a remote satellite up-link, remote cable head end or hub and the like. In such a situation, the remote functional element may require only moderate amounts of control data. Thus, the cost in terms of installation and under utilization of bandwidth capacity is not clearly justified in providing OOB communication channels.

Therefore, it is seen to be desirable to include command and control information within an in-band channel(s), such that command and control information may be provided to functional elements or subscribers receiving and/or processing the in-band channel. Moreover, it is deemed to be desirable to provide such in-band control or messaging information in a manner avoiding interference with content or other streams normally provided by the in-band communication channel.

SUMMARY OF THE INVENTION

The disadvantages heretofore associated with the prior art are overcome by the present invention of a method and apparatus for providing in-band messaging through a video switch or other functional element forming a multiplexed content stream prior to transport processing and/or transmission of the multiplexed content stream via an in-band communications channel.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
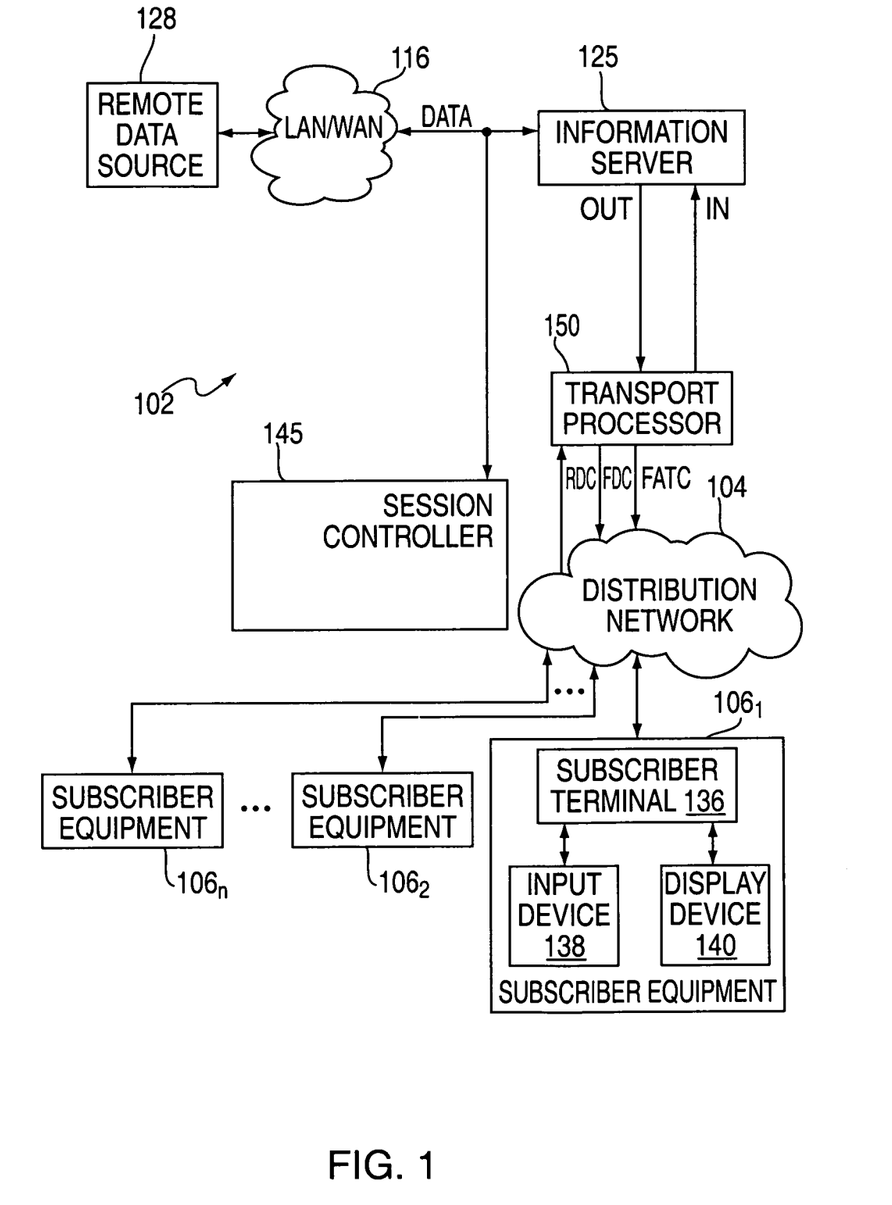
FIG. 1 depicts a high level block diagram of an interactive information distribution system.

FIG. 1 depicts a high level block diagram of an interactive information distribution system. Specifically, FIG. 1 depicts a high level block diagram of an interactive information distribution system 100 containing the present invention. The system 100 contains service provider equipment 102, a communications network 104 and subscriber equipment $106_n$, where n is an integer greater than zero.

The service provider equipment 102 comprises an information server 125, a session controller 145 and a transport processor 150. Briefly, the session controller 145, in response to a request(s) from subscriber equipment 106, causes the requested content to be retrieved from the information server 125 and provided to the transport processor 150. The transport processor 150 combines or multiplexes the retrieved content to provide an output data stream for the requesting subscriber(s). The output data stream is conditioned for transport to the requested subscriber via a forward application transport channel (FATC) within the distribution network 104.

The information server 125 is used to store content such as movies, television programs and other information offerings of the interactive information distribution system 100 of FIG. 1. Additionally, the information server 125 is used to store assets such as bit map imagery, graphic overlay, control scripts and the like. The assets may comprise, for example, navigation assets that are used by a set top terminal to interactively navigate, and select for viewing, the offerings or content available from the service provider equipment 102. The information server 125, in response to a control SC produced by the session controller 145, provides content and/or asset data to the transport processor 150. The content and asset storage module will be described in more detail below with respect to FIG. 2.

A remote data source 128 is coupled to the information server 125 via a local area network (LAN) or wide area network (WAN). The remote data source 128 may comprise a remote work station, web site, content provider, content production facility and the like. The LAN/WAN 116 comprises, illustratively, an Ethernet network suitable for transporting internet protocol (IP) packets. Thus, the information server 125 receives a data stream DATA comprising content, control messages, command messages and other information formatted according to the IP data structure. The processing of information provided to the information server 125 via the LAN/WAN 116 will be described in more detail below with respect to FIG. 2 and FIG. 3. Briefly, the information server 125 operates to convert IP data packets received from the LAN/WAN 116 into MPEG packets or other data structures suitable for multiplexing into the output stream OUT provided to the transport processor 150. Since the IP packets retrieved from the LAN/WAN are typically not as time sensitive as content packets provided to subscribers, the repacketized IP packets are inserted into the output stream OUT on a bandwidth available basis.

The session controller 145 provides session control of the information flowing to and from the information server 125, and may be generally described as a system providing or controlling communications between, for example, a cable system head-end and one or more set top terminals 136. The session controller communicates with and controls the information server via command and control messages sent via the data path DATA, illustratively an Ethernet network path. In response to a user request for particular content, the session controller 145 causes the requested content file and to be streamed from the information server 125 to the transport processor 150.

The session controller 145 sends data, such as commands, encryption keys and the like, to set top terminals via a forward data channel (FDC). The session controller 145 receives data, such as information stream requests and session initiation data (set top identification, capability and the like) via a reverse data channel (RDC). The FDC and RDC are supported by the distribution network 104 and comprise relatively low bandwidth data channels, such as one-two megabits per second data channels utilizing QPSK, QAM, or other modulation techniques. The FDC and RDC are also known as "out-of-band" channels, while the relatively high bandwidth forward application transport channel (FATC) is also known as an "in-band" channel. The session controller 145 acts as the forward data channel FDC and reverse data channel RDC via the Ethernet link denoted as DATA. As will be described in more detail with respect to FIG. 2, the Ethernet link DATA is coupled to a switch within the information server 125. The switch provides an output signal OUT to the transport processor 150. The output signal comprises "in-band" channel data with multiplexed out-of-band channel data, such as data to be carried by the forward data channel (FDC).

The transport processor 150 accomplishes all of the channel transmission interface requirements of the system 100 of FIG. 1. Specifically, the transport processor 150 is coupled to subscriber equipment via the forward applications transport channel (FATC), the forward data channel (FDC) and the reverse data channel (RDC). That is, the transport processor 150 is capable of providing a plurality of scrambled or unscrambled content and/or asset streams modulated onto various in-band carrier frequencies suitable for use in the distribution network 104. The FATC is supported by the distribution network 104 and comprises a relatively high bandwidth communications channel well suited to carrying video, audio and data such as, for example, multiplexed MPEG-2 transport packets. It should be noted that data normally conveyed to a set top terminal via the FDC may be included in the FATC data stream.

The transport processor 150 receives an output stream OUT provided by the information server 125. The transport processor 150 modifies the format of the output stream OUT to conform structure of the data provided by the information server 125 to the data structure appropriate to the forward application transport channel FATC. For example, in the case of the information server 125 providing packetized information via a data structure conforming to the high speed ASI (HS-ASI) data format previously discussed, the transport processor 150 extracts appropriate MPEG-2 video, audio and other data from the HS-ASI stream and repackages the extracted information into a data structure suitable for transport via the FATC and supported by the distribution network 104. The transport processor 150 also contains a modulator for modulating the combined content and asset stream onto one or more carrier frequencies for transmission on the FATC, the so-called "in-band" carrier frequencies.

The transport processor 150 also processes non-content data inserted within the output stream OUT provided by the information server 125. That is, as will be discussed in more detail below with respect to FIG. 2, non-content data provided by the session controller 145 or the remote data source 128 via the Ethernet data link DATA is multiplexed into the output stream OUT provided by the information server 125. This non-content data comprises control data ad other messages intended for use by the transport processor (or sub-systems within the transport processor) or by subscribers 106 receiving the forward application transport channel and forward data channel provided by the transport processor 150. The transport processor 150 extracts the non-content data from the output stream out provided by the information server 125, modifies the data structure of the extracted data to conform to the data structure appropriate to the FATC or the FDC. The extracted data is then coupled to the FATC or the FDC for transport to the subscribers 106 requiring the extracted data.

Thus, in the case of the remote data source 128 providing, for example, internet protocol (IP) data, the information server 125 processes and includes the IP data within the output stream OUT provided to the transport processor 150. In this manner, a single forward data connection between the information server 125 and transport processor 150 is utilized. This technique avoids the use of a second forward data connection to transport data specifically intended for the forward data channel. The transport processor 150 also contains a modulator for modulating the extracted non-content data, where appropriate, onto one or more carrier frequencies for transmission on the FDC, via the so-called "out-of-band" carrier frequencies.

The transport processor receives the reverse data channel (RDC) stream from the distribution network 104. The transport processor 150 contains a demodulator for demodulating the requests, messages and other data transmitted by the subscriber equipment 106 via the reverse data channel RDC. The transport processor 150 couples the information received via the RDC to the information server 125 via the signal path denoted as IN, illustratively an Ethernet link. Thus, a single Ethernet connection between the transport processor 150 and the information server 125 serves to transport all information received via the reverse data channel RDC to the information server 125 and, subsequently, to the session controller 145 via the Ethernet link denoted as DATA. It should also be noted that reverse data channel information may be transmitted to the remote data source 128 via the Ethernet connection utilizing the LAN/WAN 116.

The distribution network 104 can be any one of a number of conventional broadband communications networks that are available such as a fiber optic network, a telephone network, existing cable television network and the like. For example, if the network is a hybrid fiber-coax network, the transmission transport technique used in both forward channels may be modeled after the Moving Pictures Expert Group (MPEG) transport protocol for the transmission of video data streams.

In general, the transport mechanism for both of the forward channels that transport information to the set top terminal must be able to carry unidirectional, asynchronous packetized data such as that defined in the MPEG video and audio signal transmission protocol, and the like. There are a number of such transport protocols available.

The subscriber equipment 106 comprises a set top terminal or a set top box 136, a display device 140 (e.g. a conventional television) and a user input device 138 (e.g. a remote control device). Each set top terminal 136 receives the data streams from the FATC, demodulates the received data streams and, in the case of video streams, processes the demodulated video streams for subsequent display on the display device 140. In the case of receiving scrambled data streams, the STT descrambles the received data streams using the descrambling messages DM provided to the STT via the FATC or the FDC. The STT uses the authorization messages AM provided via the FATC or FDC to determine if a descrambling of the received scrambled stream is authorized. In addition, the set top terminal 136 accepts commands from the remote control input device 138 or other input device. These commands are formatted, modulated, and transmitted through the distribution network 104 to the session controller 145. Typically, this transmission is accomplished through the reverse data channel RDC. These commands are preferably transmitted through the same network used to transmit information to the set top terminal. However, the RDC coupling the set top terminal to the provider equipment 102 may be a separate network, e.g. a FATC through a television cable network and an RDC through a telephone network. The telephone network could also support the FDC.

Figure 2:
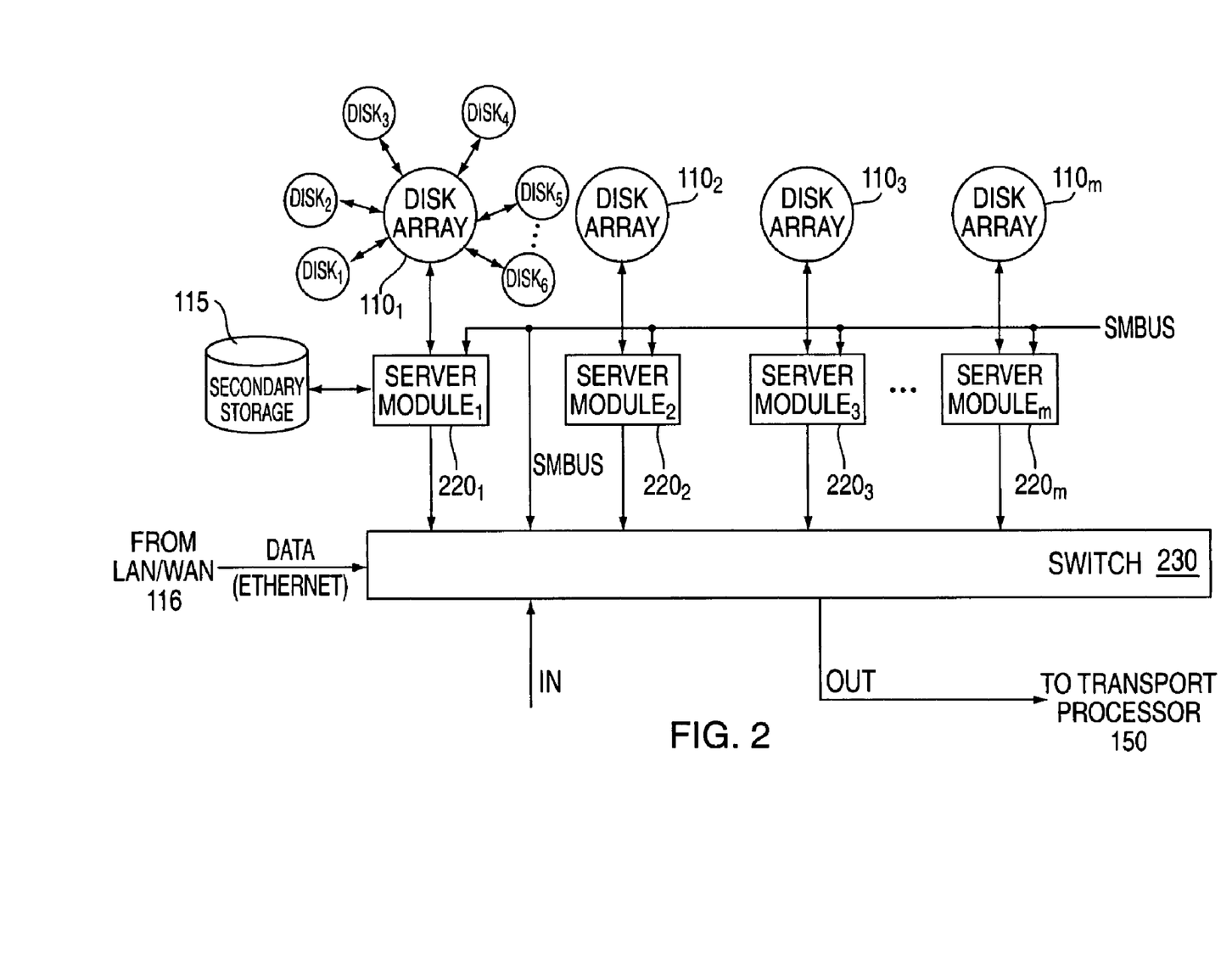
FIG. 2 depicts a block diagram of an information server suitable for use in the interactive information distribution system of FIG. 1.

FIG. 2 depicts a block diagram of an information server suitable for use in the interactive information distribution system 100 of FIG. 1. Specifically, the information server 125 of FIG. 2 comprises a plurality of server modules $220_1$-$220_m$, where m is an integer (collectively service modules 220). Each of the server modules 220 is coupled to at least one respective disk array 110 and, optionally, a secondary storage unit 115. Each of the respective disk arrays 110 comprises a plurality of disks, such as optical or magnetic storage disks. It will be noted in FIG. 2 that the first disk array $110_1$, which is coupled to the first server module ($220_1$) comprises a plurality of disks denoted as $DISK_1$ through $DISK_i$, where i is an integer. To simplify FIG. 2, disks forming the disk arrays $110_2$ through $110_m$ of the remaining server modules 2 ($220_2$) through m ($220_m$) are not shown.

In the exemplary embodiment, each server module 220 within the information server 125 includes a respective buffer memory (not shown). Each buffer memory is capable of holding at least one service period (i.e., one extent) worth of information retrieved from a disk array 110 via the respective server module 220.

The disk arrays 110 comprise high speed disk arrays suitable for providing primary storage, since they contain storage media capable of streaming (i.e., accessing and providing data during an appropriate extent deadline) content in real time to users within the system. Apparatus suitable for use in the information server 125 of FIG. 1 described by Chin et al. in U.S. Pat. No. 5,579,527, and incorporated herein by reference in its entirety.

The switch 230 operates to multiplex the output of server module 220 (i.e., the contents of each server module's buffer memory) in, illustratively, a round robin fashion to produce an output stream OUT that is coupled to the transport processor 150 for subsequent transport to the appropriate subscribers 106 via the forward application transport channel (FATC) supported by the distribution network 140. The exemplary embodiment uses a service period of two seconds. Thus, each extent retrieved from a single disk within a disk array 110 comprises approximately two seconds worth of information, illustratively, video information and associated audio information. Thus, in the case of 30 frames per second video, each server module buffer must hold at least 60 frames of video and any associated audio information. Each server module buffer is sized to hold, illustratively, one extent for each of the subscribers served by the respective server module. Thus, in the case of a server module supporting 500 subscribers, the corresponding server module buffer is sized to handle 500 extents (e.g., 500 service periods-1,000 seconds).

The switch 230 also receives a data signal DATA from the local area network/wide area network 116, illustratively a signal conforming to one of the Ethernet protocols. The data signal may comprise messages or commands intended to be used by subscribers within the system or functional modules or elements within the system that receive and/or process information provided by the switch 230. The switch 230 also receives a control signal TPC from the session controller 145. The control signal TPC may be used by the session controller to insert control information into the in-band channel for subsequent use by subscribers or functional elements within the system. In this manner, the out-of-band forward channel FDC may be avoided entirely within the system.

The switch 230 also receives an input signal IN from the transport processor 150, illustratively a signal conforming to one of the Ethernet protocols. The input signal IN is used to provide back channel or reverse data channel communications from the subscriber equipment 106 to, for example, the session controller 145. The switch 230 also is used to couple each of the server modules 220 to the Ethernet link comprising the data signal data and input signal IN. Specifically, the server's module bus SMBUS, illustratively an Ethernet link connecting at least portions of the server modules 220, is coupled to the session controller 145 and LAN/WAN 116 via the Ethernet signal using the switch 230.

In the exemplary embodiment, the data signal DATA received from the LAN/WAN 116 comprises internet protocol (IP) packets, while the content data provided to the switch 230 via the server modules 220 is illustratively formatted according to a high-speed version of the structures defined by the Digital Video Broadcasting-Asynchronous Serial Interface (DVB-ASI). The high-speed DVB-ASI (HS-ASI) data structures are described in more detail in commonly assigned Ser. No. 09/459,215, which is incorporated herein by reference in its entirety. Briefly, the HS-ASI data structures or packet format comprises a header portion and a payload portion. The header portion includes destination information and other information useful in routing HS-ASI packets within a network environment, illustratively a ring network or star network provided with high speed optical transmission media, such as described in commonly assigned, simultaneously filed U.S. patent application Ser. No. 09/458,339.

The exemplary HS-ASI packet includes a 188 byte payload portion. In the case of a HS-ASI packet carrying MPEG video information, audio information or other information, four bytes of the 188 byte payload are utilized for the MPEG header information, while the remaining 184 bytes are utilized for the MPEG data. In the case of a HS-ASI packet carrying IP data, the HS-ASI payload includes a four byte MPEG header followed by 184 bytes of raw IP data. That is, the very large (relative to HS-ASI and MPEG transport packets) IP data packet structure is divided into a plurality of 184 byte portions, where each of the IP packet portions is formed into an MPEG packet having a four byte MPEG header and the 184 byte MPEG payload portion including the respective portion of the IP packet. Alternatively, the entire 188 byte payload portion of a HS-ASI packet may be used to include a respective 188 byte portion of an IP packet. In this instance, it is important to include information within the header of the HS-ASI packet indicative of the fact that the HS-ASI packet includes IP data, rather than MPEG data. Similarly, in the case of a HS-ASI packet comprising MPEG data (video, audio, other data or IP data portions), the HS-ASI packet includes in its header portion an identifier indicative of the fact that the payload portion of the HS-ASI packet includes MPEG encapsulated data whether video data, audio data, other data.

Alternatively, IP packets are encapsulated in LLC/SNAP frames, and then segmented into multiple 184 byte data fields within respective multiple MPEG packets. Since, in one embodiment of the invention, the HS-ASI network does not guarantee delivery, detection of incomplete LLC/SNAP frames occurs at the destination ring node, e.g. transport processor 150. If IP packet is UDP, then the application layer is responsible for requests for retransmission. If TCP is used, then the TCP layer handles guaranteed packet/frame delivery. The HS-ASI network, however, does guarantee that MPEG packets carrying IP data will arrive in sequence.

In the case of IP data packets including addressing or destination information, that addressing or destination information may be included within the header portion of the resulting HS-ASI packet. Moreover, in the case of an IP packet that is segmented into a plurality of IP sub-packets prior to incorporation into a HS-ASI or MPEG packet, each of the IP sub-packets may be associated with an identification number such that the IP sub-packets may be combined at a destination functional element or subscriber to form an appropriate IP packet. That is, assuming that a single IP packet is divided into 1,000 IP sub-packet, each of the 1,000 IP sub-packets is associated with a continuity converter (e.g., 1 to 1,000) that indicates the relative position of each IP sub-packet with respect to the other IP sub-packet forming the original packet.

The switch 230 processes all of the received data streams, illustratively, the various content streams provided by the server modules 220 in HS-ASI packet format as well as the IP packets received by the Ethernet or other data or packet structures received from the session controller 145. The switch 230 preferentially multiplexes content data received from the server modules 220. That is, since the primary or critical function of the video-on-demand system is the transport of requested video and associated audio data to a subscriber, the primary function of the switch 230 is the routing of such requested video and associated audio information to the subscriber via the transport processor 150. Thus, the switch 230 operates to insure that its available bandwidth is preferentially utilized to couple content to the transport processor 150. However, in the case where the bandwidth of the switch is not fully utilized in transporting content data, the switch 230 inserts the IP data received from the LAN/WAN 116 or other data received from the session controller 145 into the output stream OUT provided to the transport processor 150.

Figure 3:
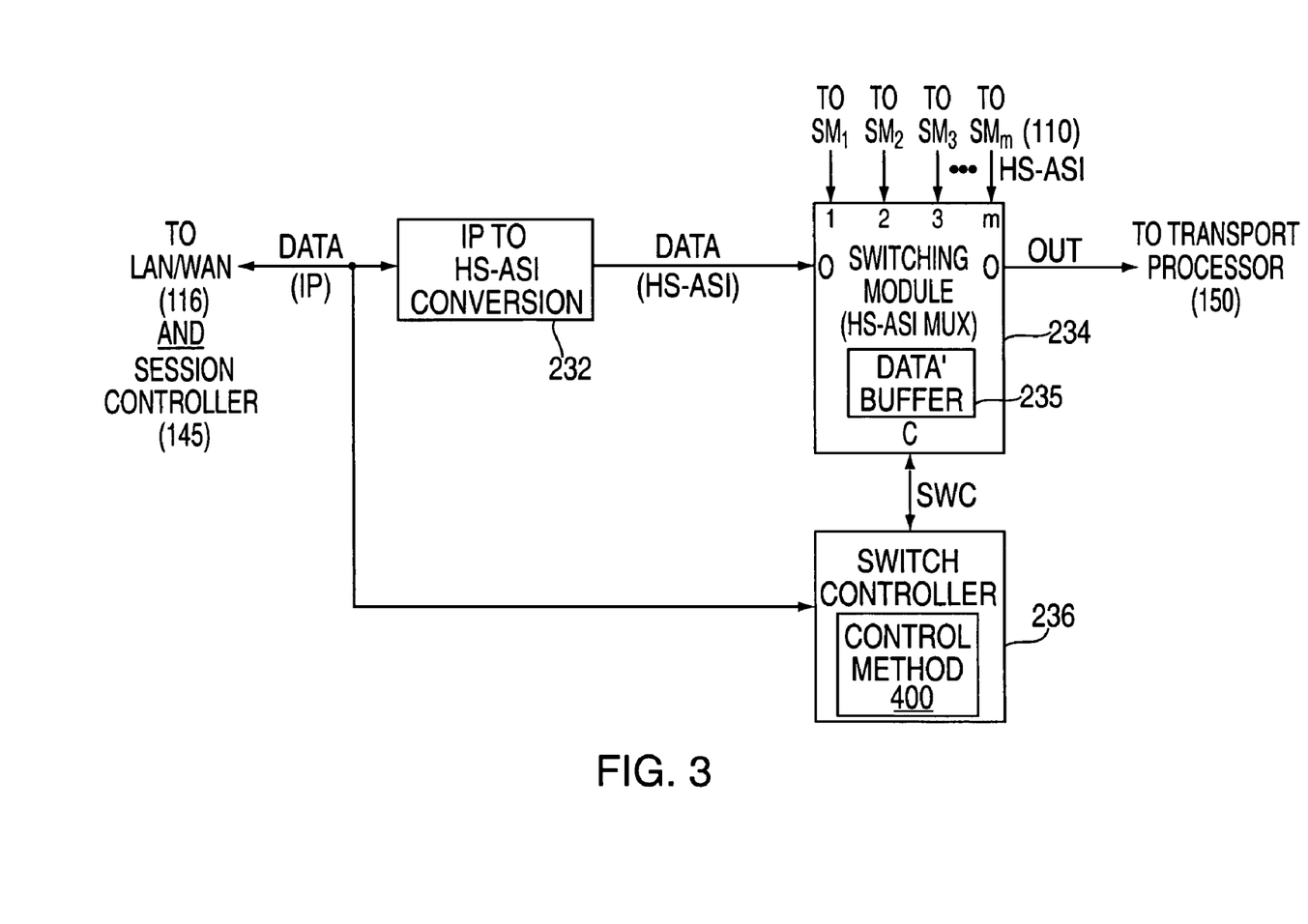
FIG. 3 depicts a high level block diagram of a portion of a switch suitable for use in the information server of FIG. 2.

It should be noted that the priority of the IP data can be configured for various quality of service levels by a combination of statistical queuing in the IP to HS-ASI data converter module 232, managing the insertion of HS-ASI packets into data buffer 235, and managing the priority of service in the switching module 234 of server module SM inputs and DATA' buffer 235 inputs. For example, on some failures of the system, sending status and correcting IP messages to transport processor 150 is a higher priority than sending video MPEG packets that may get dropped.

It is important to note that, in the exemplary embodiment, the output of the switch is always a HS-ASI packet structure. This is because the HS-ASI packet structure is well suited for transport via high speed optical networks, such as advantageously used in the interactive information distribution system 100 of FIG. 1 to route information to the transport processor 150. The switch 230 will be discussed in more detail below with respect to FIG. 3. However, it will be appreciated by those skilled in the art that other data structures and network topologies may be advantageously employed to couple bandwidth intensive data such as the aforementioned content data to the transport processor 150.

In one embodiment of the invention, the switch controller 236 implements a prioritization method responsive to either the types of data being transferred via the switching module 234, or the types of IP data being transferred by the switching module 234. Specifically, in one embodiment of the invention, IP packets are given prioritization over video and audio MPEG packets. In another embodiment of the invention, one class of IP packets is given prioritization over one or more other classes of IP packets. For example, those IP packets associated with system control functions or preferred subscribers are given priority over those IP packets associated with non-system control functions or non-preferred subscribers. It should be noted that system control IP packets will generally be given priority over non-system control IP packets. Further, when performing a statistical multiplexing or statistical queuing of received packets, the switching module 234 may be able to predict future bandwidth availability and, therefore, give priority to IP packets over video and audio MPEG packets. However, it is important to note that at no time should the MPEG video and audio packets be "de-prioritized" in a manner tending to degrade the presentation of video and audio data to a subscriber. That is, in one embodiment of the invention, non-content data comprises control data and non-control data. The switch may preferentially multiplex (i.e., prioritize) the non-content data comprising control information such that system elements requiring that control information may be rapidly communicated with. Additionally, the switch 230 may preferentially multiplex the non-content control data over either the video and/or audio data provided by the server modules or the non-content non-control data. Other permutations of these prioritizations will be readily appreciated by those skilled in the art.

FIG. 3 depicts a high level block diagram of a portion of a switch suitable for use in the information server of FIG. 2. Specifically, the portion of the switch 230 depicted in FIG. 3 comprises a IP to HS-ASI conversion module 232, a switch module 234 including a DATA' buffer 235 and a switch controller 236.

The switch module 234 receives content data from the service modules $SM_1$ through $SM_m$ via respective input ports 1 through m. The content packets forming the content extents received from the server modules 220 are multiplexed to form an output stream which is coupled to the transport processor 150 via the signal path OUT. Additionally, the switch module 234 receives a switch control signal SWC from the switch controller 236 via a control input port C. The switch controller 236 is used to control which input port 1 through m is coupled to the output port O such that the bandwidth capability of the switch module 234 is maximally utilized to transport content to the transport processor 150.

The switch controller 236 is coupled by the Ethernet link DATA to LAN/WAN 116 and the session controller 145. Control signals received via the Ethernet link may include information to be transported to subscribers or functional elements receiving or processing the in-band channel. In this case, the messages or control information to such functional elements or subscribers is coupled to the switch module 234 as a HS-ASI packet including addressing information suitable for routing the message or control information to the appropriate functional element or subscriber. The HS-ASI packet is stored in the DATA' buffer 235 of the switch module 234 for subsequent insertion into the output stream OUT. The switch controller 236, upon determining that the switch module bandwidth is less than maximally utilized providing content, responsively causes HS-ASI packets within the DATA' buffer 235 to be inserted into the output stream OUT. In this manner, IP data, MPEG data messages and control information may be passed from the session controller (or Remote Data Source 128) to various destinations within the system via the in-band channel.

The IP to HS-ASI conversion circuit 232 receives data from, illustratively, an Ethernet link coupled to a local area network/wide area network 116, or any network interface supporting IP packets, e.g. frame relay, ATM and the like. Illustratively, the internet protocol (IP) data is converted to HS-ASI data packets in the manner previously described. The HS-ASI packets so formed are then coupled to the switch module 234 via the signal path DATA', where they are stored in the buffer DATA' 235. As previously noted, upon determining that the bandwidth capability of the switch module 234 is less than maximally utilized, the switch module 234 causes the HS-ASI packets within the DATA' buffer 235 to be inserted into the output stream for subsequent processing by the transport processor 150.

Thus, the above-described switch 230 is capable of multiplexing content information from various server modules 220, data from a remote data network and data from a local data source into an output stream having a format appropriate for subsequent transport via the in-band data channels of the interactive information distribution system 100 of FIG. 1. This "in-band messaging" or "in-band routing" of control messages, status messages or other data provides a highly effective, and rapid, means of routing data through the system.

Figure 4:
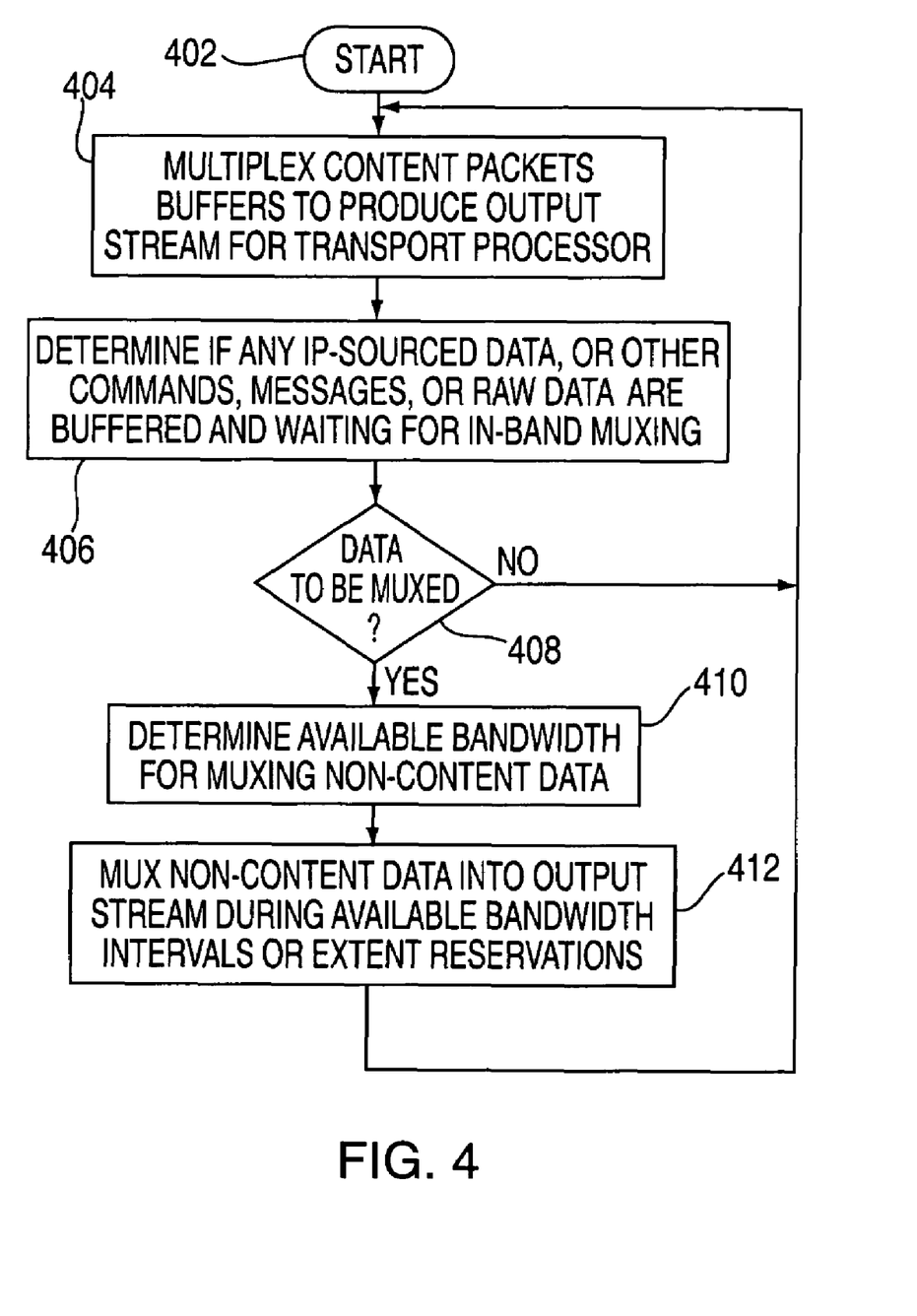
FIG. 4 depicts a flow diagram of a method suitable for use in the information server of FIG. 2.

FIG. 4 depicts a flow diagram of a method suitable for use in the information server of FIG. 2. Specifically, FIG. 4 depicts a method 400 suitable for use in the switch 230 of the information server 125 for incorporating IP data into the multiplexed output stream OUT.

The method 400 is entered at step 402 and proceeds to step 404, where the respective content packets provided by the server modules 220 are multiplexed to produce the output stream OUT that is coupled to the transport processor 150. The method 400 then proceeds to step 406.

At step 406, a determination is made as to whether any IP-sourced data or other commands, messages or raw data are stored within the DATA' buffer 235 and waiting for in-band multiplexing. It is noted that the HS-ASI input signal DATA' received by the switch module 234 is stored within the DATA' buffer 235 until such time as the received DATA' information may be multiplexed into the output stream. Similarly, data provided to the switch module 234 via the switch control signal SWC provided by the switch controller 236 is also stored within the DATA' buffer 235 for subsequent multiplexing into the output stream OUT. The data received via the DATA' signal and by the SWC signal paths is continually stored in the DATA' buffer 235. The method 400 then proceeds to step 408.

At step 408, a query is made as to whether data within the DATA' buffer 235 is to be multiplexed. If the query is answered negatively, then the method 400 proceeds to step 404, where the multiplexing of content data proceeds. If the query is answered affirmatively, then the method 400 proceeds to step 410.

At step 410, a determination is made as to the available bandwidth for multiplexing non-content data. That is, at step 410 a determination is made as to whether the bandwidth available to the switch module 234 is fully consumed by the processing of content data. Bandwidth may be available due to server modules not presently being active, due to active server modules servicing fewer than the maximum number of possible subscribers and due to other reasons. Thus, in the case of bandwidth being available based on, for example, a lack of necessity to multiplex a particular extent or buffer content into the output stream, that bandwidth may be utilized to transport information stored within the DATA' buffer 235 to the appropriate functional element or subscriber within the system 100. The method 400 then proceeds to step 412.

At step 412, the non-content data stored within the DATA' buffer 235 is multiplexed into the output stream OUT during available bandwidth intervals or extent reservations. That is, a service interval or extent servicing period identified at step 410 as being available to non-content data is noted and, at step 412, the available service interval is utilized to transport data stored within the DATA' buffer 235. The method 400 then proceeds to step 404. The above-described method addresses the notion of determining bandwidth availability and responsibly providing non-content (typically) information stored within the DATA' buffer 235 to the transport processor 150 on a bandwidth availability basis. It should be noted that the DATA' buffer 235 receives data from the DATA' signal path and SWC signal path as that data is provided from, respectively, the IP to HS-ASI conversion module 232 and the switch controller 236.

Although various embodiments which incorporate the teachings of the present invention have been shown and described in detail herein, those skilled in the art can readily devise many other varied embodiments that still incorporate these teachings.

What is claimed is:

1. In an information distribution system comprising server equipment for providing both content and non-content data to subscriber equipment, said server equipment comprising:
   a multiplex switch for multiplexing a plurality of formatted content data from server modules to produce an output stream for transport to the subscriber equipment via a communication channel, wherein said multiplexing of said formatted content data is statistically performed; said multiplex switch comprises a converter module for formatting non-content data and a switching module for selectively multiplexing formatted non-content data into said output stream, wherein said multiplexing of formatted non-content data is on a future bandwidth availability basis that is predicted based on said multiplexing of said formatted content streams; and
   a transport processor coupled to the multiplex switch for receiving the output stream from the multiplex switch and for transmitting to the multiplex switch reverse data channel information received via a reverse data channel.

2. The server equipment of claim 1, wherein said multiplex switch includes a buffer for storing non-content data and a switch controller for determining a bandwidth utilization level of said multiplex switch, said switch controller further for causing at least a portion of said non-content data in said buffer to be multiplexed into said output stream when said bandwidth utilization level falls below a threshold utilization bandwidth level.

3. The server equipment of claim 2, wherein said threshold bandwidth utilization level comprises a utilization level sufficient to process a single time extent, wherein said content streams are divided into a plurality of respective time extents.

4. The server equipment of claim 2, wherein each of said content streams is divided into a plurality of respective time extents, and wherein said multiplex switch can multiplex a predefined number of time extents into said output stream.

5. The server equipment of claim 1, wherein said non-content data comprises control data and non-control data, and wherein said multiplex switch preferentially multiplexes said non-control data.

6. The server equipment of claim 1, wherein said non-content data comprises control data and non-control data, and wherein said multiplex switch preferentially multiplexes control data.

7. The server equipment of claim 1, wherein said content data includes MPEG data.

8. The server equipment of claim 1, wherein said non-content data includes internet protocol data.

9. A method of providing content and non-content data to subscriber comprising the steps of:

statistically multiplexing a plurality of formatted content streams to produce an output stream for transport to the subscriber via a communication channel;

formatting non-content data to fit the output stream;

predicting future bandwidth availability based on the statistical multiplexing of the formatted content streams;

selectively multiplexing formatted non-content data into said output stream on a future bandwidth availability basis; and receiving reverse data channel information.

10. The method of claim 9 further including storing non-content data until bandwidth availability enables multiplexing of the stored non-content data.

11. The method of claim 9, furthering including dividing content streams into a plurality of respective time extents that are multiplexed a predefined number at a time into the output stream.

12. The method of claim 9 wherein the output stream is an MPEG data stream.

13. The method of claim 9 further including receiving the non-content data in an internet protocol format.

* * * * *